United States Patent
Chen et al.

(10) Patent No.: US 10,563,438 B1
(45) Date of Patent: Feb. 18, 2020

(54) HINGE DEVICE WITH HELICAL GEAR

(71) Applicant: LIANHONG ART CO., LTD., Taoyuan (TW)

(72) Inventors: Chia-Hui Chen, Taoyuan (TW); Chia-Ming Chang, Taoyuan (TW)

(73) Assignee: LIANHONG ART CO., LTD., Taoyuan (TW)

( * ) Notice: Subject to any disclaimer, the term of this patent is extended or adjusted under 35 U.S.C. 154(b) by 0 days.

(21) Appl. No.: 16/359,053

(22) Filed: Mar. 20, 2019

(30) Foreign Application Priority Data

Dec. 11, 2018 (TW) .............................. 107216788 U
Dec. 11, 2018 (TW) .............................. 107217567 U

(51) Int. Cl.
*E05D 3/06* (2006.01)
*E05D 7/00* (2006.01)
*E05D 5/10* (2006.01)
*E05D 11/08* (2006.01)

(52) U.S. Cl.
CPC ................ *E05D 5/10* (2013.01); *E05D 3/06* (2013.01); *E05D 11/082* (2013.01); *E05D 2005/106* (2013.01); *E05Y 2201/71* (2013.01)

(58) Field of Classification Search
CPC .. E05D 3/12; E05D 3/122; E05D 3/06; E05D 3/10; E05D 11/082; E05D 11/087; E05D 2011/085; G06F 1/1681; G06F 1/1616; G06F 1/1618; G06F 1/168; E05Y 2900/606; E05Y 2900/602; H04M 1/0216; H04M 1/0222; H04M 1/022; H05K 5/0226; Y10T 16/547; Y10T 16/541
See application file for complete search history.

(56) References Cited

U.S. PATENT DOCUMENTS

| | | | | |
|---|---|---|---|---|
| 8,578,561 B2* | 11/2013 | Chuang | ................. | G06F 1/1681 16/354 |
| 8,776,319 B1* | 7/2014 | Chang | ................. | G06F 1/1681 16/303 |
| 9,057,215 B1* | 6/2015 | Horng | ....................... | E05D 3/12 |
| 9,464,471 B1* | 10/2016 | Chen | ..................... | G06F 1/1681 |
| 9,606,578 B2* | 3/2017 | Yuan | ..................... | G06F 1/1616 |
| 9,617,770 B1* | 4/2017 | Lin | ....................... | E05D 11/082 |
| 9,921,613 B2* | 3/2018 | Kuramochi | ........... | G06F 1/1618 |
| 2009/0070961 A1* | 3/2009 | Chung | .................... | E05D 3/122 16/354 |

(Continued)

FOREIGN PATENT DOCUMENTS

TW            M548415            9/2017

*Primary Examiner* — Chuck Y Mah
(74) *Attorney, Agent, or Firm* — Guice Patents PLLC

(57) ABSTRACT

A pivoting device having helical gear includes a first shaft and a second shaft, wherein the first shaft has a first rod, the first rod has a first axial gear, and the second shaft has a second rod, the second rod has a second axial gear. A first connecting plate is connected between the first shaft and the second shaft, and a connecting gear set is arranged between the first shaft and the second shaft, the connecting gear set meshes with the first axial gear and the second axial gear. One end of the connecting gear set is connected to the first connecting plate, and the other end of the connecting gear set is connected a second connecting plate. The first torque set is connected between the first shaft and the second shaft. A third connecting plate is connected between the first shaft and the second shaft.

12 Claims, 9 Drawing Sheets

(56) References Cited

U.S. PATENT DOCUMENTS

| | | | | |
|---|---|---|---|---|
| 2012/0096678 A1* | 4/2012 | Zhang | ................... | G06F 1/1681 |
| | | | | 16/302 |
| 2012/0192381 A1* | 8/2012 | Zhang | ................... | G06F 1/1681 |
| | | | | 16/366 |
| 2013/0111704 A1* | 5/2013 | Mitsui | ................... | H04M 1/022 |
| | | | | 16/250 |
| 2014/0251045 A1* | 9/2014 | Hsu | ....................... | G06F 1/1681 |
| | | | | 74/96 |
| 2015/0159413 A1* | 6/2015 | Chen | ....................... | E05D 3/122 |
| | | | | 16/342 |
| 2015/0160695 A1* | 6/2015 | Su | ......................... | G06F 1/1618 |
| | | | | 16/366 |
| 2015/0184439 A1* | 7/2015 | Hsu | .......................... | G06F 1/16 |
| | | | | 16/350 |
| 2015/0342068 A1* | 11/2015 | Su | ......................... | G06F 1/1681 |
| | | | | 16/354 |
| 2015/0362958 A1* | 12/2015 | Shang | ................... | G06F 1/1681 |
| | | | | 361/679.58 |
| 2016/0011632 A1* | 1/2016 | Hsu | ........................ | E05D 3/122 |
| | | | | 16/354 |
| 2016/0032633 A1* | 2/2016 | Hsu | ........................ | E05D 3/122 |
| | | | | 16/368 |
| 2016/0274625 A1* | 9/2016 | Horng | ................... | G06F 1/1681 |

\* cited by examiner

HINGE DEVICE WITH HELICAL GEAR

BACKGROUND OF THE INVENTION

Field of the Invention

The invention relates to a hinge device, and more particularly to a hinge device having a structure generating relative torque.

Description of the Related Art

With the evolution of technology, electronic products are becoming lighter and thinner. Therefore, tablets have been introduced on the market, and tablets have a slim profile compared to ordinary notebook computers. Operated by touch screen, the tablet has its convenience.

In order to stand the tablet at an appropriate angle for a user to operate or view the tablet, many support devices for tablet computers have been developed, and such support devices have many types, such as a bookshelf like, or a support stand structure combined with the tablet computer, thereby providing a better use angle for the user.

For example, the Taiwan Utility Patent No. M548415 discloses a hinge device and an electronic device using the same, wherein the hinge device comprises a carrier plate, a first shaft member, a second shaft member, a synchronous mechanism, a first torsion member, and a second torsion member. The first shaft member and the second shaft member are pivotally disposed on the carrier plate, and the synchronous mechanism is disposed between the first shaft member and the second shaft member, so that the first shaft member and the second shaft member rotate simultaneously in opposite directions. The two plates of the electronic device are respectively fixed to the first shaft member and the second shaft member, and the two plate members are relatively rotated to an opened position through the hinge device.

The structure disclosed in the prior art provides a relative rotation of the plate of the electronic device, causing the user to open and close, however, the torque generated by the torsion structure of the structure on the tail end of the pivot is insufficient. This causes the plate may return to a predetermined position when it has insufficient rotation.

BRIEF SUMMARY OF THE INVENTION

An object of the invention is to provide a hinge device having helical gear including torque sheet sets. The torque sheet sets having different torque sheets to generate relative interference torque, which stabilize the rotation of the hinge device.

The invention provides a hinge device having helical gear. The hinge device in accordance with an exemplary embodiment of the invention includes a first shaft, a second shaft, a first connecting plate, a connecting gear set, a second connecting plate, a first torque set, a third connecting plate and a plurality of friction sheets. The first shaft includes a first rod having an end connected to a first base and another end having a first groove, a first axial gear formed on the first rod and a first engaging groove formed between the first axial gear and the first base. The second shaft includes a second rod having an end connected to a second base and another end having a second groove, a second axial gear formed on the second rod and a second engaging groove formed between the second axial gear and the second base. The first connecting plate connects the first shaft and the second shaft, wherein the first connecting plate connects the first engaging groove and the second engaging groove. The connecting gear set is disposed between the first shaft and the second shaft and includes a first gear and a second gear meshed with the first gear, wherein the first gear meshes with the first axial gear, the second gear meshes with the second axial gear, and the first gear and the second gear are connected to the first connecting plate. The second connecting plate is connected to another end of the connecting gear set and includes two through holes through which the first shaft and the second shaft extend. The first torque set connects the first shaft and the second shaft and includes a plurality of first torque sheets, wherein each of the first torque sheets comprises a plurality of through holes and connects the first shaft and the second shaft. The third connecting plate connects the first shaft and the second shaft and includes engaging holes engaging the first groove and the second groove. The friction sheets are disposed between the second connecting plater and the third connecting plate and generating friction force to increase torque.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
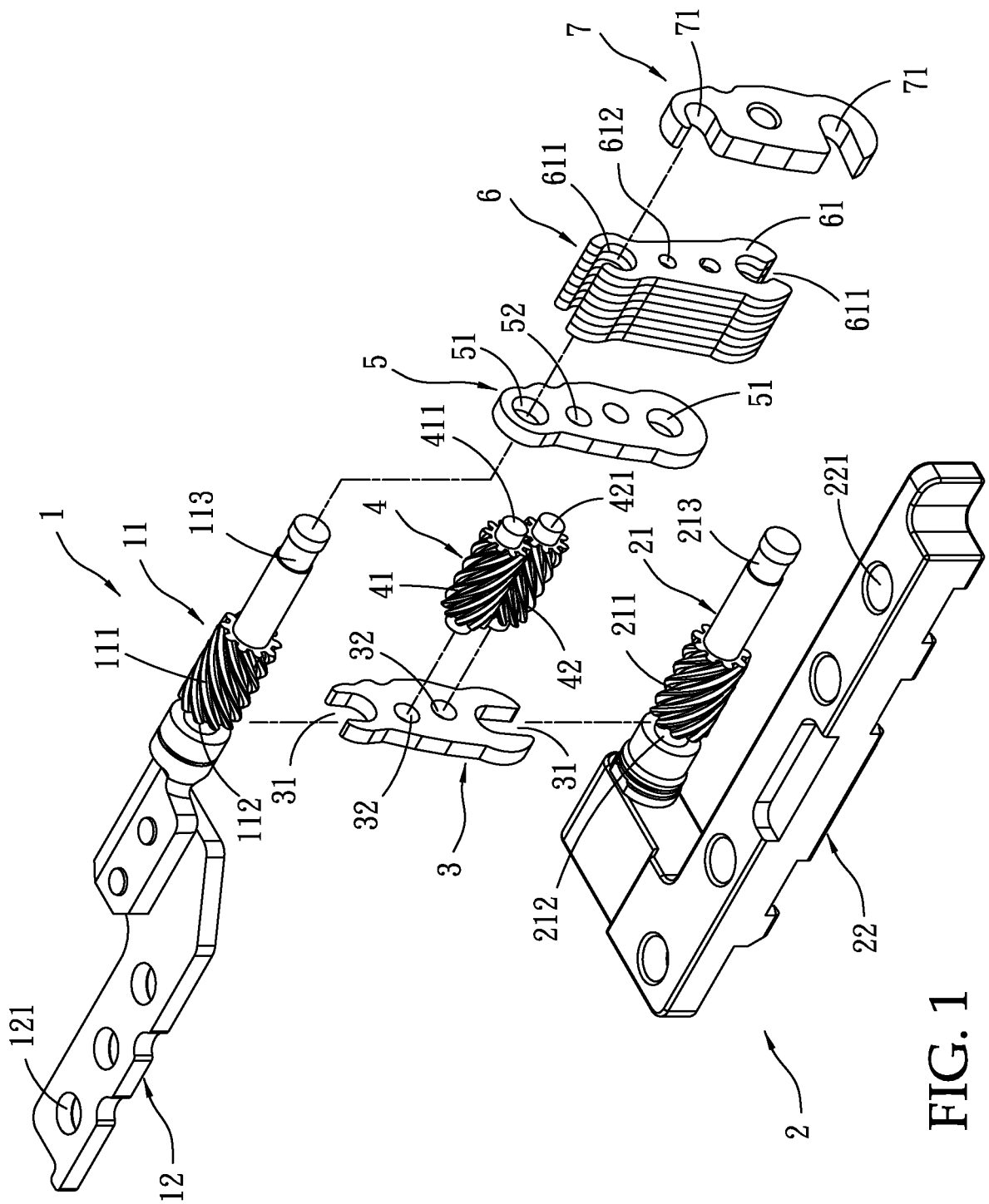
FIG. 1 is an exploded view of an embodiment of a hinge device of the invention.

Referring to FIG. 1, which is a perspective structural view of the first embodiment of the present invention. As shown in FIG. 1, a hinge device of the present invention mainly includes a first shaft 1 and a second shaft 2, wherein the first shaft 1 has a first rod 11 and one end of the first shaft 11 is connected to a first base 12 which has a plate shape. The first base 12 has a plurality of first connecting holes 121, and the first rod 11 has a first axial gear 111. In this embodiment, the first axial gear 111 and the first rod 11 are integrally formed on the first rod 11. A first engaging groove 112 is formed between the first axial gear 111 and the first base 12. A first groove 113 is formed on another end of the first rod 11. The second shaft 2 has a second rod 21, and one end of the second shaft 21 is connected to a second base 22 which has a plate shape. The second base 22 has a plurality of second connecting holes 221, and the second rod 21 has a second axial gear 211. In the present embodiment, the second axial gear 211 is integrally formed with the second rod 21. A second engaging groove 212 is formed between the second rod 21 and the second axial gear 211. A second groove 213 is formed on another end of the second rod 21.

Referring to FIG. 1 again, the hinge device further includes a first connecting plate 3 connecting the first shaft 1 and the second shaft 2. Each of the two ends of the first connecting plate 3 has a C-shaped notch 31. The C-shaped notch 31 engages to the first engaging groove 112 and the second engaging groove 212 respectively, thereby fixing the relative position between the first shaft 1 and the second shaft 2. The first connecting plate 3 has a plurality of first through holes 32. The hinge device further includes a connecting gear set 4 disposed between the first shaft 1 and the second shaft 2. The connecting gear set 4 further includes a first gear 41 and a second gear 42 meshed with each other. The first gear 41 meshes with the first axial gear 111, and the second gear 42 meshes with the second axial gear 211. The two ends of the first gear 41 and the second gear 42 respectively have a through shaft 411 and 421, and the through shaft 411 and 421 at one end of the first gear 41 and the second gear 42 are inserted into the first through hole 32 of the first connecting plate 3. A second connecting plate 5 is further connected to another end of the connecting gear set 4, and each of two ends of the second connecting plate 5 respectively has a connecting hole 51. The first rod 11 and the second rod 21 are inserted into the connecting hole 51 and are in close contact with the first axial gear 111 and the second axial gear 211. The second connection plate 5 is further provided with a plurality of second through holes 52 for receiving the through shafts 411 and 421 at another ends of the first gear 41 and the second gear 42 to position the connecting gear set 4.

Figure 2:
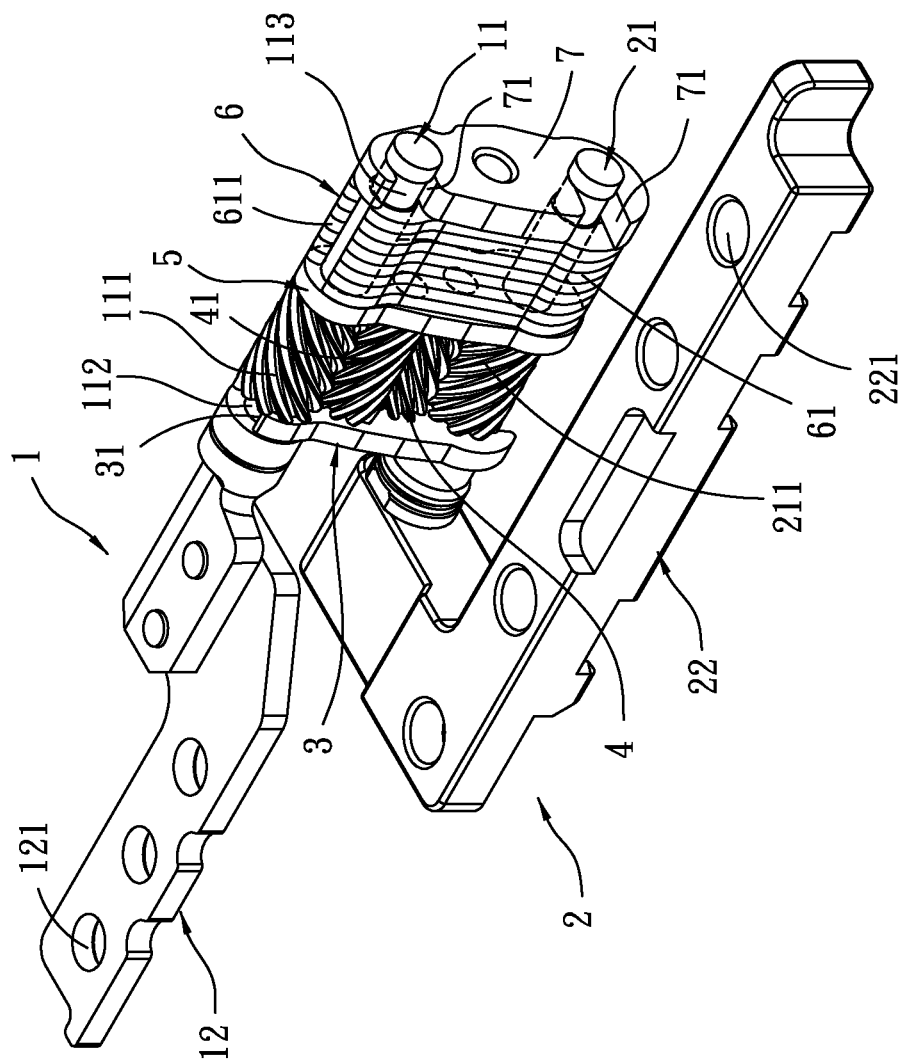
FIG. 2 is a perspective view of an embodiment of a hinge device of the invention.

Referring to FIG. 1, the hinge device further includes a first torque set 6 and a third connecting plate 7. The first torque set 6 and the third connecting plate 7 are connected between the first shaft 1 and the second shaft 2. The first torque set 6 includes a plurality of first torque sheets 61. Each of the first torque sheets 61 has a C-shaped notch 611 at each end thereof, and the C-shaped notches 611 at the two ends of the first torque sheets 61 are respectively fastened on the first rod 11 and the second rod 21. A plurality of through holes 612 are formed on the first torque sheets 61. The third connecting plate 7 is provided with notches 71 at both ends thereof. The notches 71 are C-shaped and the openings of the notches 71 are opened in an identical direction. The notches 71 of the third connecting plate 7 are respectively fastened to the first groove 113 and the second groove 213. Thereby, the relative position of the first torque set 6 between the first shaft 1 and the second shaft 2 is fixed. The assembled diagram is as shown in FIG. 2.

Figure 3:
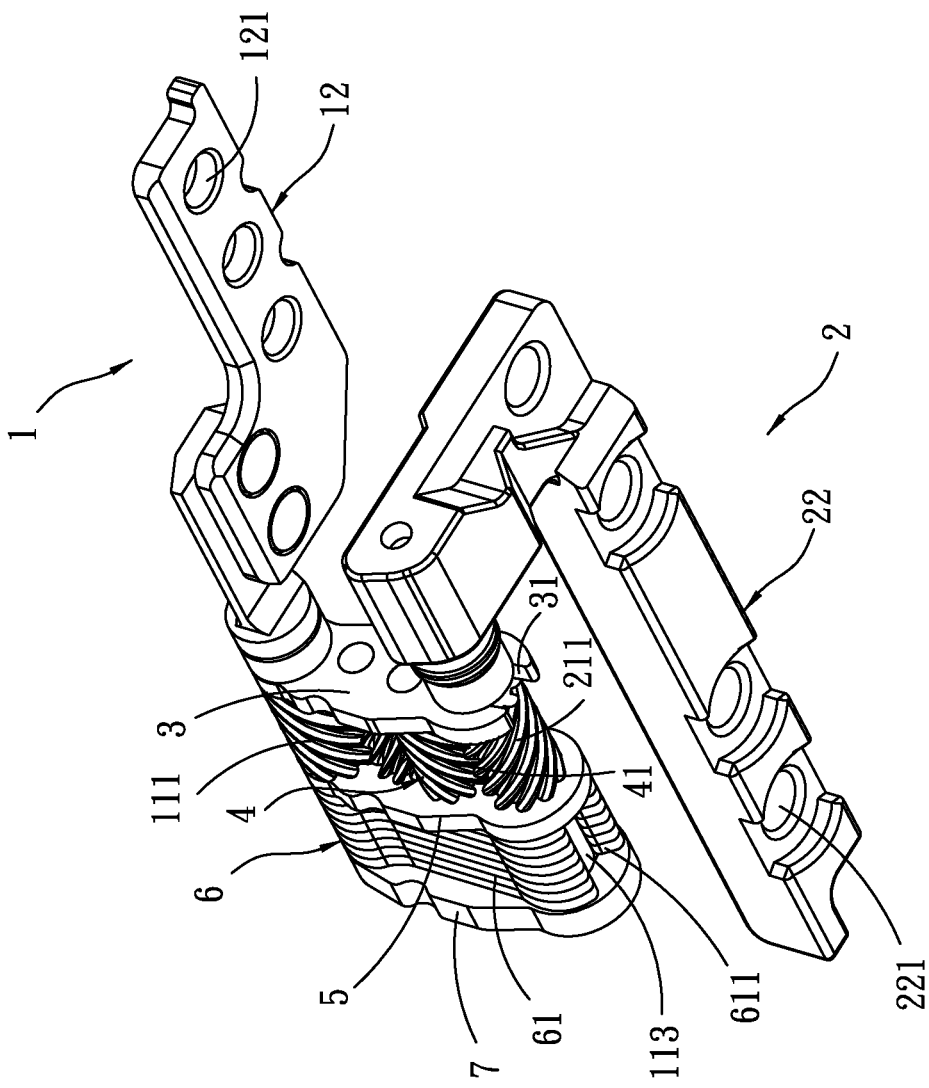
FIG. 3 another perspective view of an embodiment of a hinge device of the invention.

Referring to FIG. 3, which is a schematic view of the operation of the first embodiment of the invention. As shown in FIG. 3, the first axial gear 111, the second axial gear 211, and the connecting gear set 4 are synchronous mechanisms, whereby the first shaft 1 and the second shaft 2 are rotated in opposite directions. The first torque set 6 disposed on the first rod 11 and the second rod 21 generate torque through interference in the positions of connection of the first torque set 6 to the first shaft 1 and the second shaft 2 when the first shaft 1 and the second shaft 2 rotate, so that the first shaft 1 and the second shaft 2 control the output and recovery of the rotating force and the hinge device thus produces a smooth rotating action.

Figure 4:
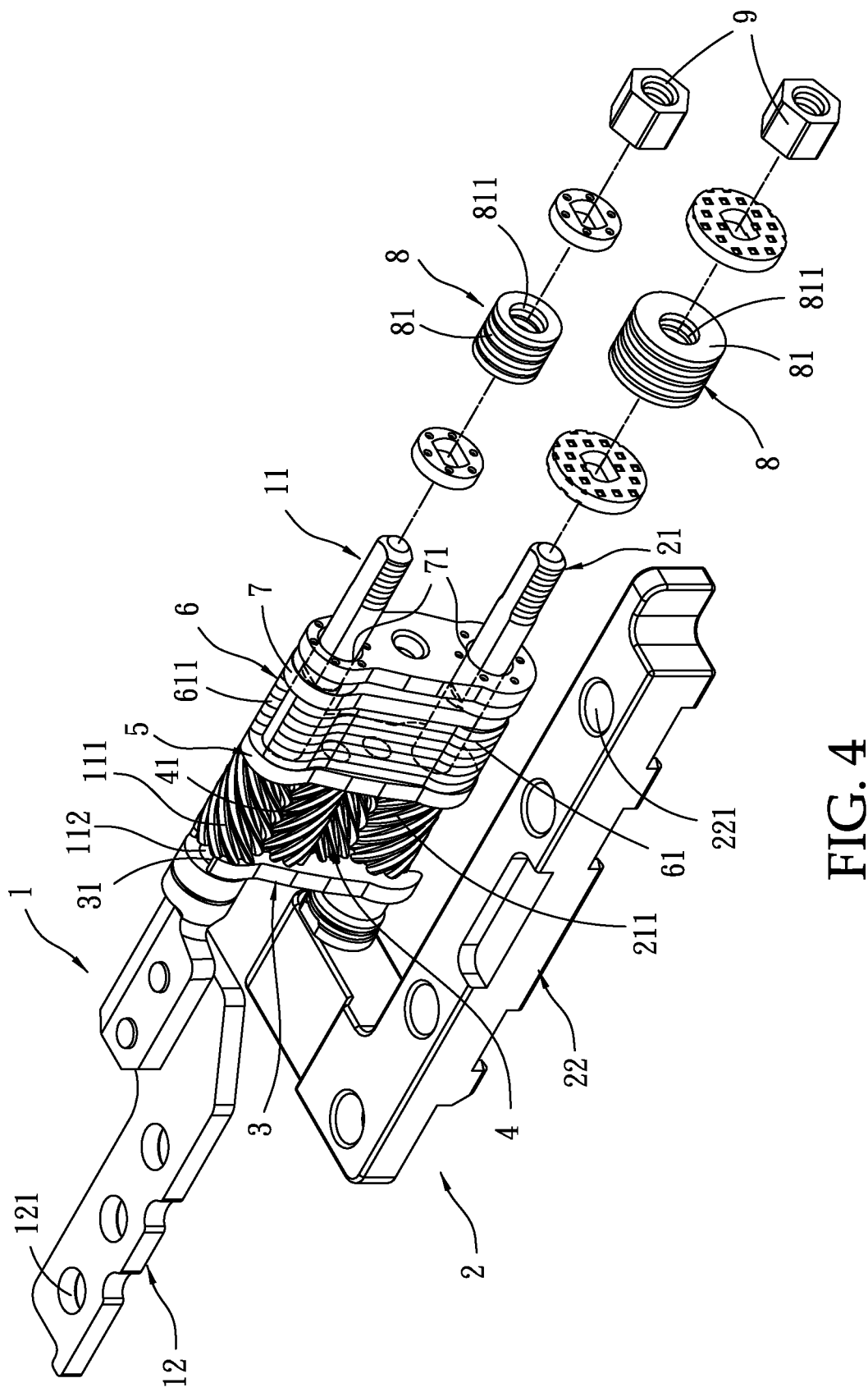
FIG. 4 is an exploded view of another embodiment of a hinge device of the invention.
Figure 5:
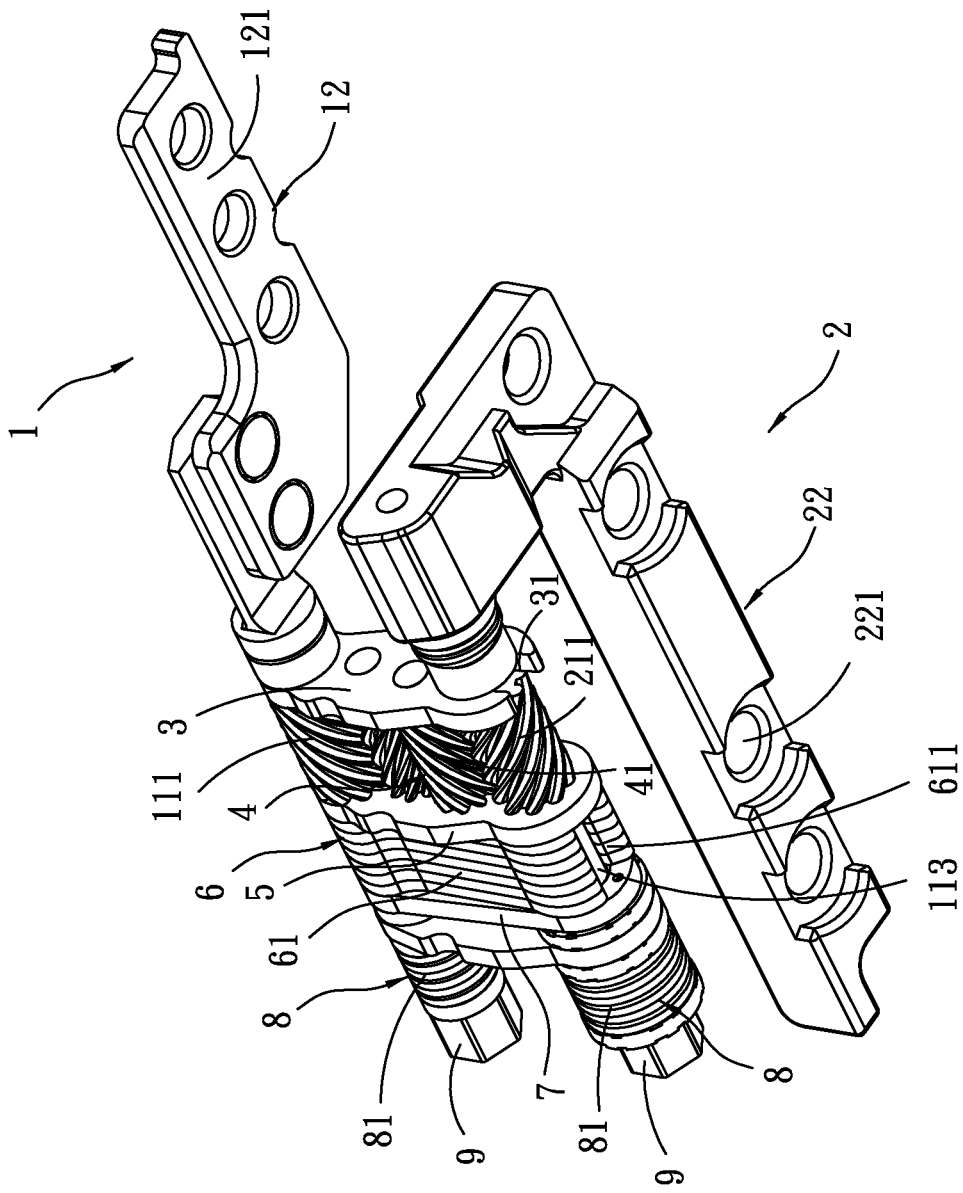
FIG. 5 is a perspective view of an embodiment of a hinge device of the invention.

Please refer to FIG. 4, which is a perspective view of the second embodiment of the present invention. As shown in FIG. 4, in the embodiment, the first rod 11 and the second rod 21 respectively extend and connect a second torque set 8. The second torque set 8 includes a plurality of second torque sheets 81. In the embodiment, the second torque sheet 81 is disc-shaped, and each of the second torque sheets 81 has a second through hole 811 at the axial center for inserting the first rod 11 and the second rod. The first rod 11 and the second rod 21 are respectively screwed to a nut 9 for fixing the relative positions of the second torque sets 8 on the first rod 11 and the second rod 21. Referring to FIG. 5, the second torque set 8 provides a second set positions of torque output, so that the first shaft 1 and the second shaft 2 control the output and recovery of the rotating action. In addition, in the present embodiment, the second torque sheet 81 of the second torque set 8 to which the first rod 11 and the second rod 21 are connected are not identical in size so as to generate different torque.

Figure 6:
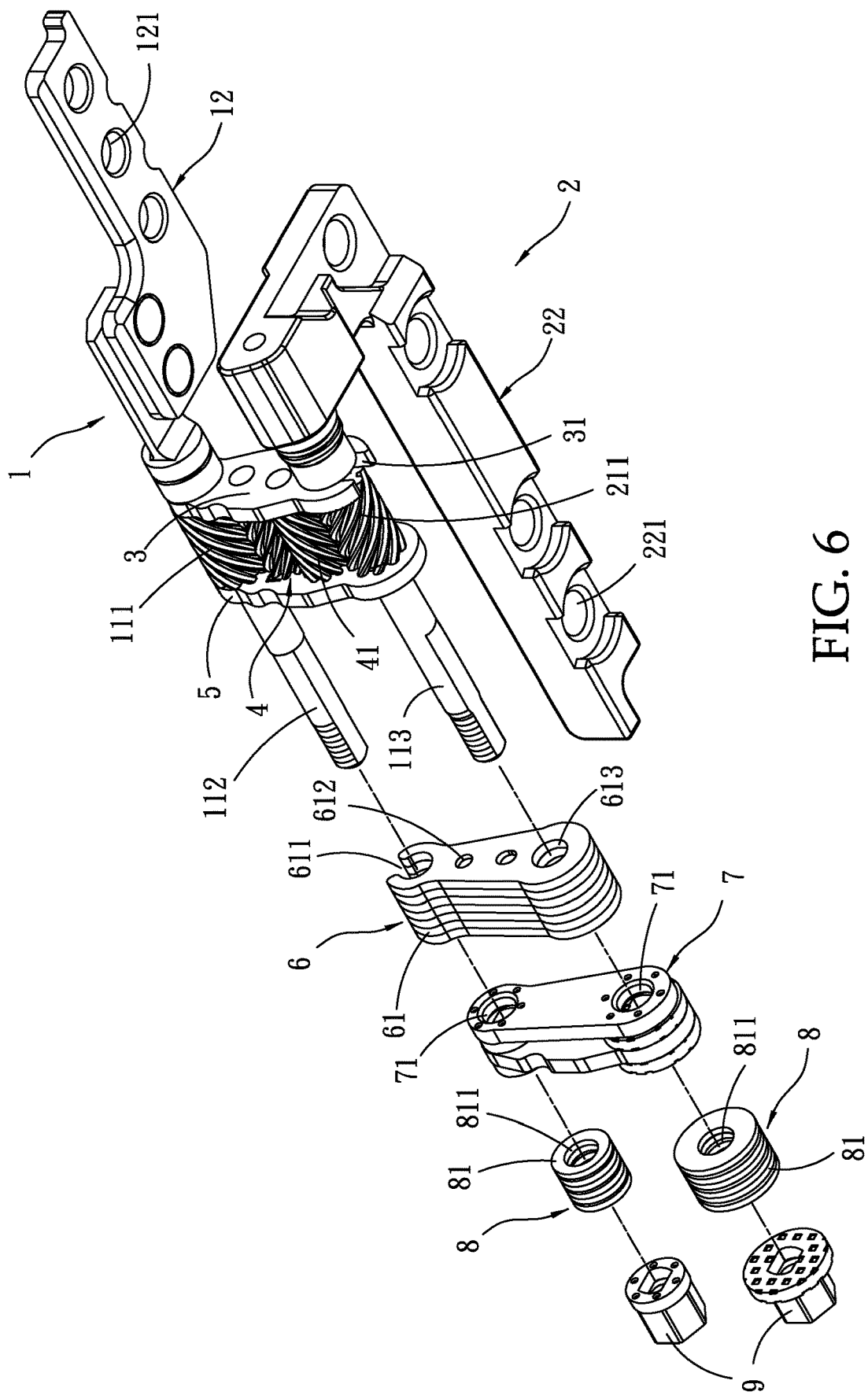
FIG. 6 is an exploded view of another embodiment of a torque set of a hinge device of the invention.
Figure 7:
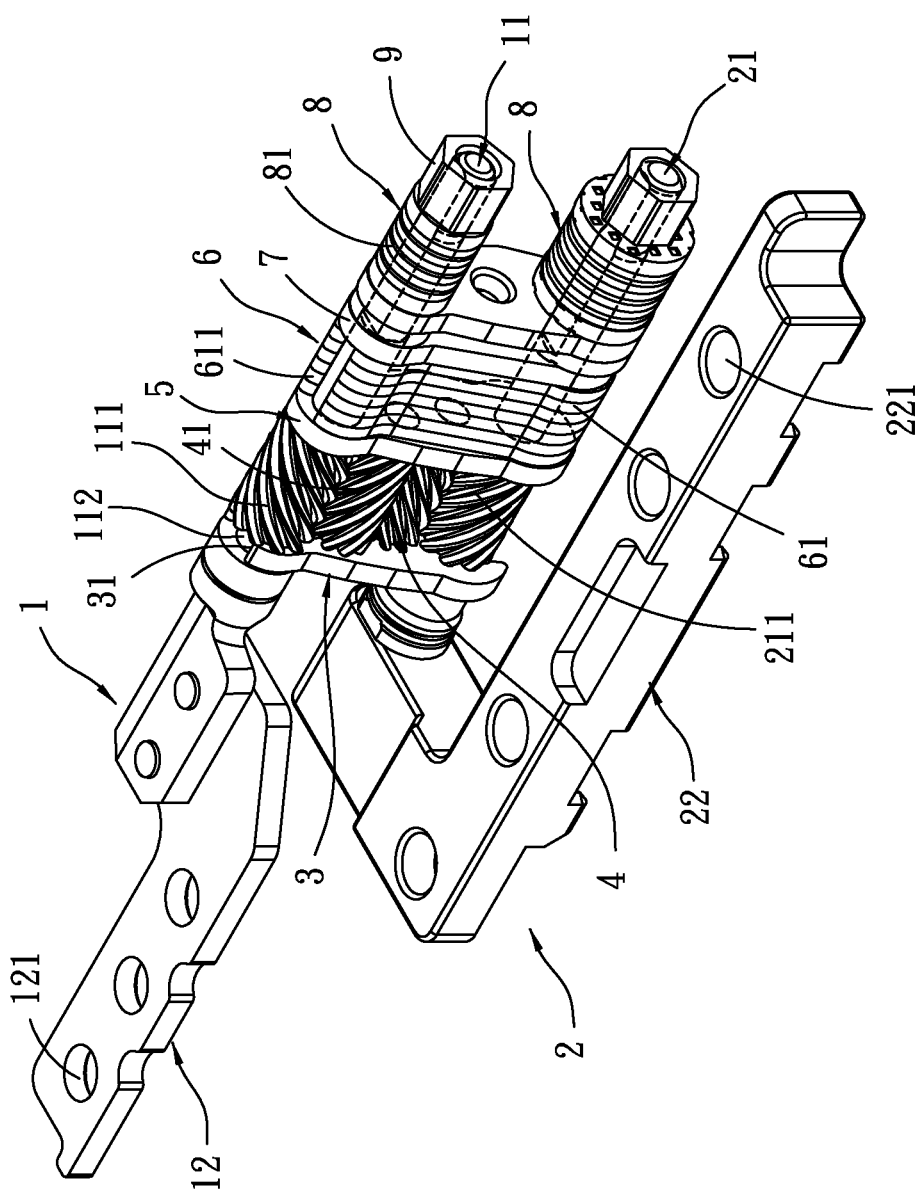
FIG. 7 is a perspective view of another embodiment of a hinge device of the invention.

Referring to FIG. 6, it is a perspective view of the third embodiment of the present invention. As shown in FIG. 6, in the embodiment, the first torque sheets 61 of the first torque set 6 has a C-shaped notch 611 at one end and a first insertion hole 613 at the other end. In the embodiment, the C-shaped notch 611 is fastened to the first rod 11, and the first insertion hole 613 is used for the second shaft 21 to extend therethrough. FIG. 7 is a schematic operation diagram of the third embodiment. When the first shaft 1 and the second shaft 2 of the hinge device are rotated, only the first torque set 6 connected to the first rod 11 generates an interference output torque, and the first torque set 6 connected to the second rod 21 does not produce interference torque so that the output torque can be adjusted in different implementation fields.

Figure 8:
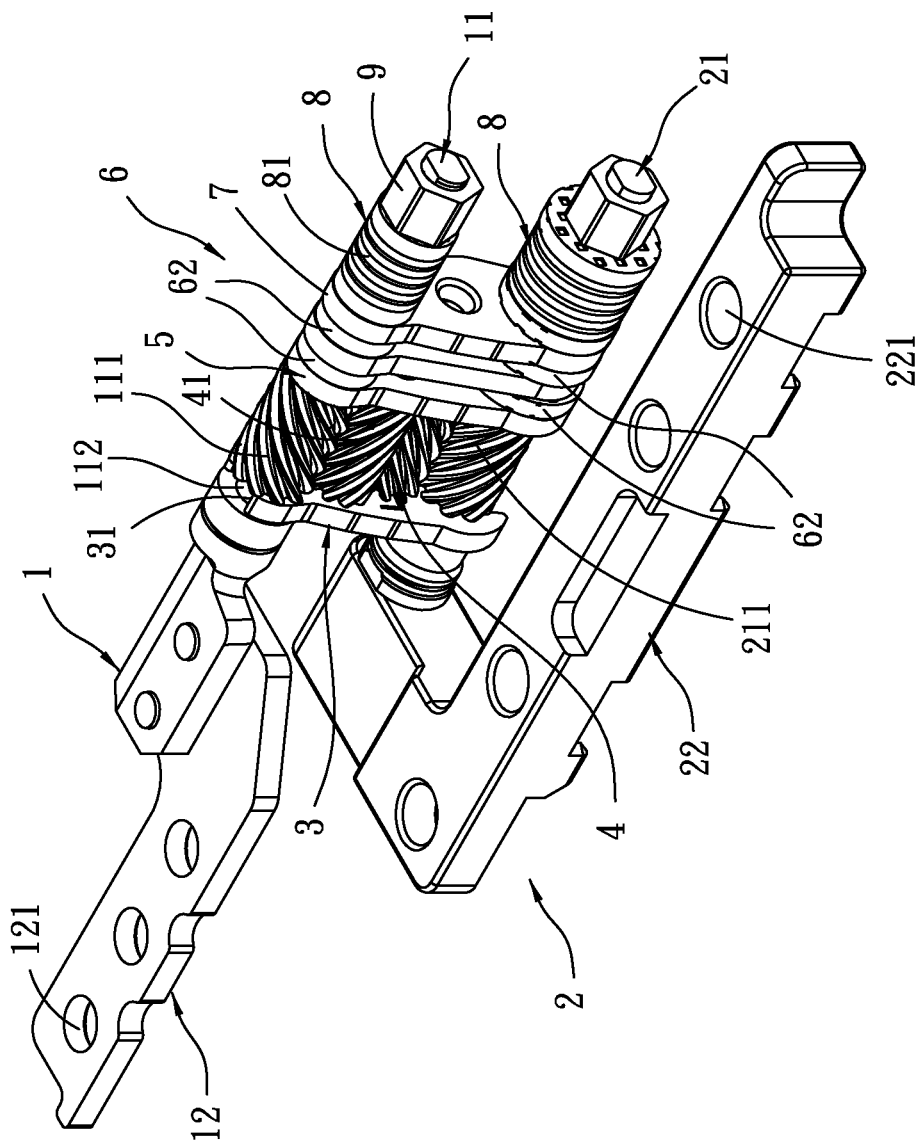
FIG. 8 is a perspective view of another embodiment of a hinge device of the invention.
Figure 9:
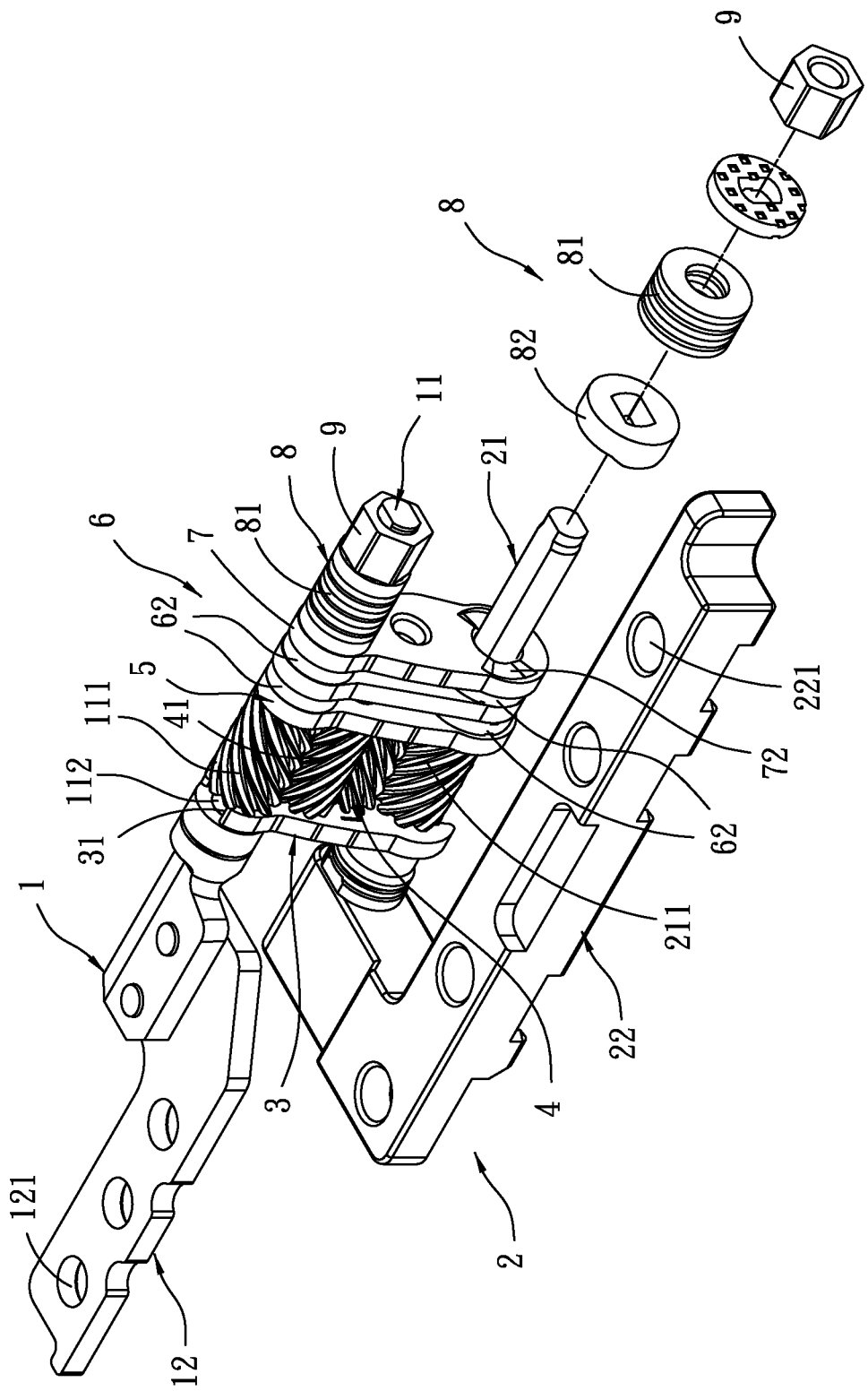
FIG. 9 is a partially exploded view of another embodiment of a torque set of a hinge device of the invention.

Referring to FIG. 8, it is a perspective view of the fourth embodiment of the present invention. As shown in FIG. 8, the first torque set 6 further includes a plurality of friction sheets 62, and the friction sheets 62 are disposed between the second connecting plate 5 and the third connecting plate 7. The frictional effect of the friction sheets 62 increases the generation and output of the torque. As shown in the FIG. 9, it is a partial exploded view of the fifth embodiment of the present invention. In the embodiment, the second torsion set 8 further includes at least one wheel 82 includes a concave portion and a convex portion. The wheel 82 is disposed on the second rod 21, and a recess 72 is formed on the third connecting plate 7. The wheel 82 adjusts an angle through rotation. The convex portion of the wheel 82 is tightly fitted to the recess 72, so that the second torque set 8 and the third connecting plate 7 are locked.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A hinge device, comprising:
 a first shaft comprising a first rod having an end connected to a first base and another end having a first groove, a first axial gear formed on the first rod and a first engaging groove formed between the first axial gear and the first base;

a second shaft comprising a second rod having an end connected to a second base and another end having a second groove, a second axial gear formed on the second rod and a second engaging groove formed between the second axial gear and the second base;

a first connecting plate connecting the first shaft and the second shaft, wherein the first connecting plate connects the first engaging groove and the second engaging groove;

a connecting gear set disposed between the first shaft and the second shaft and comprising a first gear and a second gear meshed with the first gear, wherein the first gear meshes with the first axial gear, the second gear meshes with the second axial gear, and the first gear and the second gear are connected to the first connecting plate;

a second connecting plate connected to another end of the connecting gear set and comprising two through holes through which the first shaft and the second shaft extend;

a first torque set connecting the first shaft and the second shaft and comprising a plurality of first torque sheets, wherein each of the first torque sheets comprises a plurality of through holes and connects the first shaft and the second shaft;

a third connecting plate connecting the first shaft and the second shaft and comprising engaging holes engaging the first groove and the second groove; and a plurality of friction sheets disposed between the second connecting plater and the third connecting plate and generating friction force to increase torque.

2. The hinge device as claimed in claim 1, wherein the first base and the second base are plate shape and comprises a first connecting hole and a second connecting hole.

3. The hinge device as claimed in claim 1, wherein the first axial gear is integrated with the first shaft, and the second axial gear is integrated with the second shaft.

4. The hinge device as claimed in claim 1, wherein the first connecting plate comprises C-shaped notches at two ends thereof engaging the first engaging groove and the second engaging groove respectively.

5. The hinge device as claimed in claim 1, wherein the first connecting plate comprises a plurality of first through holes, and the first gear has an end inserted into the first through hole and the second gear has an end inserted into the second through hole.

6. The hinge device as claimed in claim 5, wherein the second connecting plate comprises a plurality of first through holes into which the first gear and the second gear are inserted.

7. The hinge device as claimed in claim 1, wherein each of the first torque sheets has two C-shaped notches at two ends thereof engaging the first shaft and the second shaft.

8. The hinge device as claimed in claim 1, wherein each first torque sheet has a C-shaped notch at one ends thereof engaging the first shaft and a first insertion hole into which the second shaft is inserted.

9. The hinge device as claimed in claim 1, wherein the engaging holes are C-shaped and opened in an identical direction.

10. The hinge device as claimed in claim 1, further comprising:
   a plurality of second torque sets connecting the first shaft and the second shaft and comprising a plurality of second torque sheets, wherein each of the second torque set has a second through hole through which the first shaft and the second shaft extend; and
   a nut screwed to the first shaft and the second shaft to fasten the second torque sets at the first shaft and the second shaft.

11. The hinge device as claimed in claim 10, wherein the second torque sets are disc sheets.

12. The hinge device as claimed in claim 10, wherein the second torque set further comprises at least one wheel having a convex portion and a concave portion, the third connecting plate has a recess tightly fitted to the convex portion of the at least one wheel.

* * * * *